No. 674,333. Patented May 14, 1901.
W. J. DANINGBURG.
TIRE FOR WHEELS.
(Application filed Aug. 22, 1900.)
(No Model.)
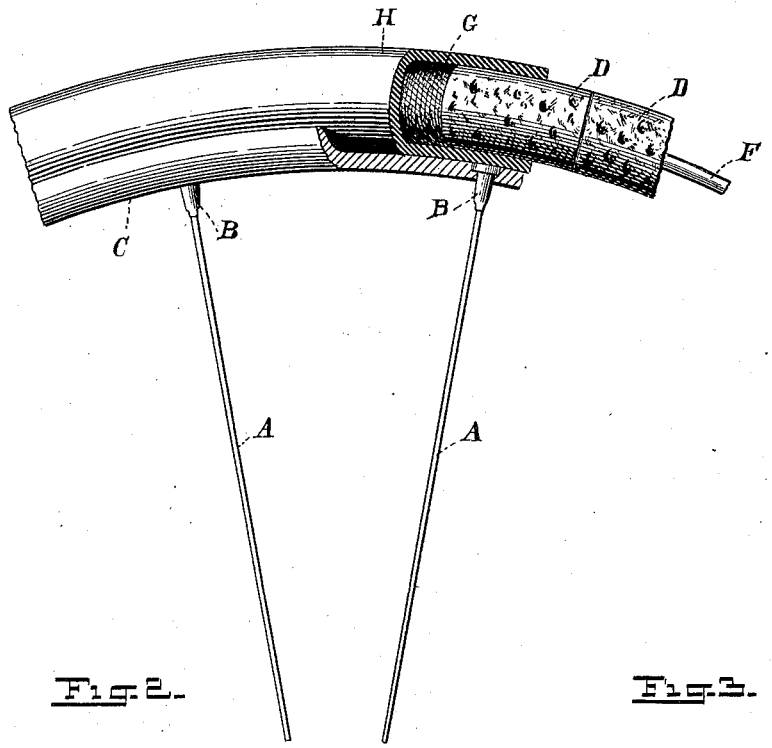
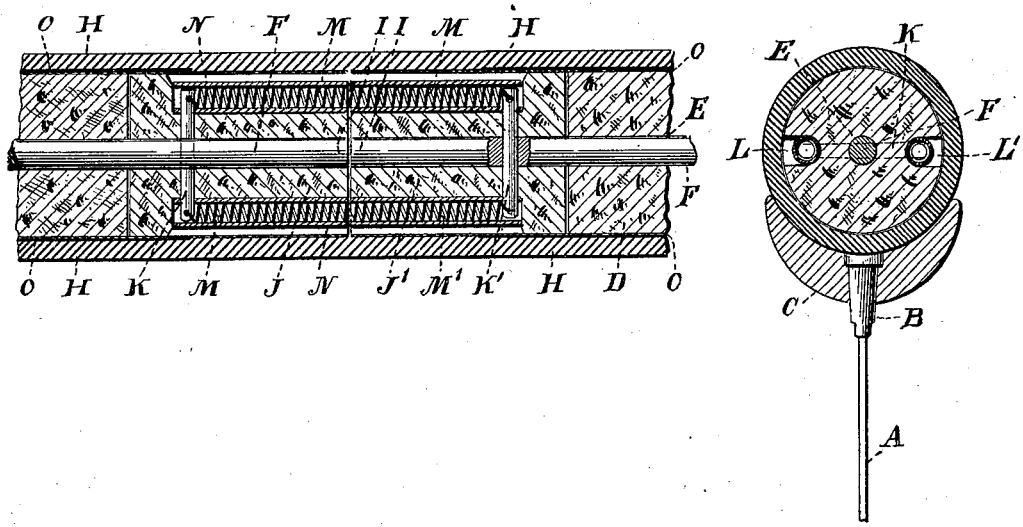
Witnesses:  
Geo. W. Naylor  
William H. Snelling
Inventor  
William J. Daningburg  
By his Attorney  
Phillips Abbott
THE NORRIS PETERS CO., PHOTO-LITHO., WASHINGTON, D. C.

UNITED STATES PATENT OFFICE.

WILLIAM J. DANINGBURG, OF NEW YORK, N. Y., ASSIGNOR OF ONE-HALF TO FRANK M. ELDREDGE, OF BROOKLYN, NEW YORK.

TIRE FOR WHEELS.

SPECIFICATION forming part of Letters Patent No. 674,333, dated May 14, 1901.

Application filed August 22, 1900. Serial No. 27,660. (No model.)

*To all whom it may concern:*

Be it known that I, WILLIAM J. DANINGBURG, a citizen of the United States, and a resident at No. 615 East One Hundred and Thirty-eighth street, in the city of New York, borough of Manhattan, in the county of New York and State of New York, have invented a new and useful Improvement in Tires for Wheels, of which the following is a full, clear, and exact description, reference being had to the accompanying drawings.

The characteristic features of my tire are these: First, it is adapted to practically all forms of vehicle-wheels—bicycles, automobiles, carriages, wagons, &c.—whether of the suspension or rigid-spoke construction; second, it is punctureless—that is to say, if punctured no harm results, because it is not of the pneumatic type and its structure is such that a puncture does it little, if any, harm; third, it is elastic and yielding, thus securing noiselessness and ease in riding, and yet it is not liable to collapse or deflation, and, fourth, its construction is such that when its outer portion or tread, which is formed of rubber, is worn out a new one can be supplied, utilizing the remainder of the structure, which will be serviceable for an indefinite time.

Referring to the drawings hereof, Figure 1 illustrates an elevation of the invention, parts being broken away to show the interior construction. Fig. 2 illustrates a horizontal sectional view of the invention. Fig. 3 illustrates a vertical transverse sectional view.

In the drawings I show my invention as applied to a suspension-wheel, portions of which appear. I use this as an illustration merely, since, as above stated, the invention is applicable to all forms of wheels.

I do not intend here to claim, broadly, the features of a tire as above explained, since I am aware that cork has been used in tires in various ways prior to my invention. I have recited all the features of such a tire as that made by me in order that its advantageous features may be more clearly understood.

A A represent the spokes of the wheel; B B, the sockets whereby the spokes are connected with the rim C.

D D illustrate two sections of cork. They may be of such length as preferred. I show them in relatively short sections, since they are supposed in this instance to have been cut transversely of the slab of cork as it appears upon the market commercially. They may, however, be cut longitudinally of the slab of cork, in which event they will be of considerable length and may be curved into circular form by wetting, if necessary, or by making saw-kerfs in the inner surface extending radially to such depth as desired. These sections are perforated centrally, as shown at E, and through the perforations extends a continuous strip F of ratan. Instead of ratan a strip of any other suitable material, such as hickory or other tough wood, or a metallic rod or wire—such as steel, brass, or copper—may be used. I prefer, however, that this rod F should be of wood, ratan, or equivalent light material, so that the weight of the tire may be reduced as much as possible. These sections of cork, whatever their length may be, are strung upon the rod F and butted up closely against one another, and in order that the circle of cork may be without angles I ordinarily prefer to cut or otherwise form the sections in such manner that each represents the arc of a circle. Also I make their abutting ends on radial lines, so that there will be no angles on their peripheral surface. They may be cemented to the rod F and their abutting ends cemented together with any suitable cementitious material.

On the outside of the cork I stretch a cover G, of some cloth-like material, such as a tightly-fitting tube made of muslin or equivalent. Instead of being tubular, and consequently seamless, it may be made by wrapping strips of the material around the cork, preferably attached to it by some cementitious substance.

H is an exterior covering of rubber which may be from one-eighth to one-quarter of an inch thick. This incloses the entire structure.

In order that the tire may be sprung over the edge of the wheel-rim, I make the joint or point of connection between the two ends of the tire as shown in Fig. 2. Other constructions may be employed; but that shown I have found serviceable. The ends of the rod F are shown at I I' and the terminal pieces of cork at J J'. In each of these pieces of cork a transverse hole is bored, through which passes a metallic pin K and K', which fit snugly in the holes made through the rod F, and at the horizontal sides of the cork there are cut two recesses L L', within which are placed sections of tubing M M and M' M'. These sections of tubing have preferably an interior diameter of approximately one-quarter inch, and within each tube there is a continuous spring N N', respectively, which connects with the ends of the cross-pins K K', so that they tend to draw the ends of the tire toward each other. These springs are given considerable stiffness, so that in all ordinary use of the tire its ends will be held firmly abutting against each other.

It will be understood that although the cork, the metallic tubes and the rod F, and the muslin or other cloth-like covering all terminate abruptly at the adjacent ends referred to, yet the exterior covering of rubber extends as a continuous piece past the joint; but the cementitious material, (indicated by the black line O,) which cements the rubber to the exterior of the muslin, is omitted for a space of two or three inches, as the case may be, at the point where the ends of the tire meet, as indicated in Fig. 2, so that when the tire is sprung upon the rim the rubber will stretch, as may be necessary, to permit it to ride over the upwardly-presented edge of the rim. It will not be necessary for it to yield much, and the requisite amount can be easily attained in the manner stated.

It will not be necessary always to employ a muslin or other cloth-like covering for the cork. The rubber may be cemented directly to the exterior surface of the cork. Nor will it be necessary under all circumstances to employ a central rod of wood or metal, because the cork may be forced into a rubber tube, particularly if the sections are in long lengths, and the ends brought together and confined in any suitable manner.

The operation of the invention is easily understood from the foregoing and special description is not necessary.

Attention is called to the following advantageous features:

First. Should the tire pass over tacks, glass, or other material which would puncture and destroy or at least interfere with the use of an ordinary pneumatic tire, no harm results to mine unless the incision should be of large area. In that event the use would not be at all interfered with and it could be quickly and inexpensively repaired at a proper time.

Second. The rubber and the cork are both yielding, soft, and noiseless, thereby securing the advantages of the pneumatic tire without its disadvantages.

Third. If the exterior covering of rubber should become worn, it is a relatively inexpensive matter to remove the tire, take off the old covering, and put on a new one.

Fourth. The use of my tires is substantially the same as that of the pneumatic tires now in use—that is to say, they are put upon the rims and cemented thereto the same as the pneumatic tires. Therefore no educational process is necessary before the public can adopt the use of my improvement.

The recesses L and L', within which the tubing M and springs N are received, may be filled with a rubber-cement or piece of cork, if deemed necessary. I do not show them filled, because as these openings are upon the side and not upon the tread of the tire I have found there is no necessity for filling them. No harm comes to the structure if they are left open, and in the event of repairs it is more convenient to have them unfilled.

Having described my invention, I claim—

1. In a tire the combination of sections of cork strung on a continuous rod or core, an exterior covering of rubber, springs located in recesses in the cork adjacent to the ends of the rod or core whereby they are normally held forcibly against each other, yet permitting separation, for the purposes set forth.

2. The combination in a tire of sections of cork strung on a continuous rod or core, an exterior protective covering, cross-pins through the rod or core near its ends, springs connecting the ends of the cross-pins, said springs being located in recesses cut at the lateral sides of the cork, whereby the ends of the rod or core will be normally held forcibly together, yet permitting their separation, for the purposes set forth.

3. In a tire the combination of sections of cork strung on a continuous rod or core, an exterior protective covering, springs at each side of the meeting ends of the rod or core inclosed within tubes set in recesses in the cork, the springs engaging with the ends of the rod or core by means of cross-pins, and means whereby the cross-pins may have the requisite longitudinal movement relative to said tubes, for the purposes set forth.

4. In a tire the combination of sections of cork strung on a continuous rod or core, a wrapping of cloth-like material about the cork-sections, an exterior protective covering of rubber, and springs connecting the ends of the rod or core located at the lateral sides of the tire and inclosed within recesses in the cork, for the purposes set forth.

Signed at New York, in the county of New York and State of New York, this 17th day of August, A. D. 1900.

WILLIAM J. DANINGBURG.

Witnesses:
PHILLIPS ABBOTT,
WILLIAM H. SNELLING.